US006589306B2

(12) United States Patent
Ronning et al.

(10) Patent No.: US 6,589,306 B2
(45) Date of Patent: Jul. 8, 2003

(54) CENTRIFUGAL SEPARATOR APPARATUS FOR REMOVING PARTICULATE MATERIAL FROM AN AIR STREAM

(75) Inventors: Richard L. Ronning, Overland Park, KS (US); Robert Kolb, Olathe, KS (US)

(73) Assignee: Ronning Engineering Co., Inc., Overland Park, KS (US)

( * ) Notice: Subject to any disclaimer, the term of this patent is extended or adjusted under 35 U.S.C. 154(b) by 0 days.

(21) Appl. No.: 09/908,260

(22) Filed: Jul. 18, 2001

(65) Prior Publication Data

US 2003/0014954 A1 Jan. 23, 2003

(51) Int. Cl.[7] .............................................. B01D 45/12
(52) U.S. Cl. ........................................ 55/349; 55/459.1
(58) Field of Search ........................... 55/345, 346, 348, 55/349, 459.1

(56) References Cited

U.S. PATENT DOCUMENTS

| 3,535,850 A | * 10/1970 | Von Ohain et al. ........... 55/347 |
| 4,193,208 A | 3/1980 | Ronning |
| 4,346,523 A | 8/1982 | Ronning |
| 4,813,154 A | 3/1989 | Ronning |
| 5,157,849 A | 10/1992 | Ronning |

* cited by examiner

Primary Examiner—Robert A. Hopkins
(74) Attorney, Agent, or Firm—Hovey Williams, LLP (57) ABSTRACT

Horizontal, negative pressure centrifugal separator apparatus (48, 248, 348, 448, 548) is provided for separating particulate material from an air stream that exhausts from the outlet of a horizontal, industrial size, rotary drum dryer (32). The centrifugal separator is especially adapted to be connected to the negative pressure inlet of a primary fan (42) which pulls large volumes of air through the rotary drum dryer. The separator apparatus includes wall structure which defines two aligned primary spiral separation plenum chambers (e.g. 78, 80) joined to an intermediate spiral discharge plenum chamber (e.g. 82), all of which intercommunicate. A pair of oppositely facing plenum chamber divider members each having a central aperture therein are mounted in the plenum chambers on opposite sides of the discharge plenum chamber and function as pressure regain stacks. Air streams containing particulate materials which are introduced into the air inlets of the primary separation plenum chambers each follow a serpentine path in a respective primary chamber before flowing through a corresponding plenum chamber divider member spiral velocity regain stack into the spiral chamber of the discharge plenum chamber. Discharge openings are provided in the primary spiral plenum chambers in positions permitting particulate material separated from the air stream as a result of centrifugal force thereon, to gravitate to a collection point therebelow. The centrifugal separator apparatus will handle an approximately 40% greater air flow than a comparable, conventional cylindrical stack member with essentially the same pressure drop.

34 Claims, 9 Drawing Sheets

CENTRIFUGAL SEPARATOR APPARATUS FOR REMOVING PARTICULATE MATERIAL FROM AN AIR STREAM

BACKGROUND OF THE INVENTION

1. Field of the Invention

This invention relates to centrifugal separator apparatus for separating particulate material from an air stream, and especially to high efficiency, horizontal, twin-flow, two stage separator apparatus with minimum air pressure drop. The centrifugal separator apparatus is particularly useful for removing particulates from the gaseous discharge from drying equipment such as large capacity, multi-stage, horizontal rotary dryers before return of the dryer exhaust gases to the atmosphere.

2. Description of the Prior Art

It has long been the practice to remove the moisture from various agricultural, industrial and by-product materials by passing the moist material through a rotary drum dryer, either of the multiple stage, multiple pass or multiple stage single pass type. Burner gases at an elevated temperature are directed through the dryer to vaporize a substantial part of the product water content and to also serve as a conveying medium for the product along the length of the dryer. Often times, a certain proportion of the dried material is recycled back to the drum dryer in order to decrease the overall moisture content of the product input to the dryer, thus enhancing the dryer's efficiency.

The gaseous discharge from the rotary dryer must be treated before being returned to the atmosphere in order to lower the amount of particulates entrained in the air stream to meet regulatory standards. In recent years, governmental agencies have imposed increasingly stringent regulations on the amount of particulates that may be discharged into the surrounding atmosphere from large scale drying equipment. Particulate removal has been accomplished for the most part by directing the particulate bearing exhaust gases from large scale, industrial sized rotary dryers into one or more upright cyclones. Although cyclones are functionally capable of substantially reducing the particulate content of a gas stream containing entrained particulate materials before return of the gas stream to the atmosphere, upright cyclones of requisite efficiency are relatively expensive, require a significant footprint area in the vicinity of the horizontal dryer, and work most effectively when two substantially identical cyclones are employed in side-by-side serial air flow relationship.

An exemplary dryer and associated cyclone separator is shown and described in my U.S. Pat. No. 4,193,208 of Mar. 18, 1980. As illustrated in FIG. 1 of the '849 patent, a burner assembly is provided that burns natural gas or a similar fuel feed stock to produce hot products of combustion which are directed into the inlet end of an elongated, generally horizontal, hollow drum heat exchanger rotatable about its longitudinal axis. The negative pressure inlet of a centrifugal discharge and fan unit is connected to the outlet end of the drum dryer for inducing flow of relatively high volumes of air through the dryer in association with the hot products of combustion from the burner assembly. The positive pressure outlet end of the fan unit is connected to the inlet of an upright cyclone collector which discharges the substantially particulate-free air back into the atmosphere.

A conveyor at the discharge end of the dryer receives dried product and directs that product to a point of use or for further drying. Similarly, product removed from the air stream directed into the cyclone gravitates from the lower end of the cyclone vessel and may, if desired, be combined with the product output from the dryer.

Another exemplary horizontal rotary dryer, fan unit and cyclone separator is described and shown in my U.S. Pat. No. 5,157,849 issued Oct. 27, 1992.

SUMMARY OF THE INVENTION

This invention concerns a horizontal, negative pressure centrifugal separator for removing particulate material from an air stream that exhausts from the outlet end of a horizontal industrial size, rotary dryer. The centrifugal separator is adapted to be connected to the negative pressure inlet of a fan assembly which functions to pull large volumes of air through the dryer drum.

The centrifugal separator preferably comprises an essentially horizontal drum having wall structure presenting two side-by-side primary material separation plenum chambers of generally spiral configuration. The primary plenum chambers mutually communicate with a central plenum chamber therebetween which is also of spiral configuration.

In one form of the centrifugal separator, frusto-conical, opened-ended, pressure regain divider stacks are positioned between each of the separation plenum chambers and the central plenum chamber. In this embodiment of the centrifugal separator, each of the separation plenum chambers has an air inlet and the central plenum has an air discharge outlet. The divider stacks each have a generally conical section which is joined to an annular stack component presenting a central aperture. The divider stacks extend into the central plenum chamber with the apertures thereof in horizontal, generally axially aligned, facing relationship.

Air containing entrained particulate material entering the air inlets of the separation plenum chambers follows a generally serpentine path within respective separation plenum chambers and then exits the plenum chambers into the central plenum chamber via the apertures in corresponding divider stacks. The conical configuration of the divider stacks, along with the annular stack component coaxial with the axis of a respective stack, which causes each of the stacks to have pressure regain properties, serves to minimize the pressure drop in the air flow therefore preventing significant air pressure loss during operation of the separator. The air flow through the centrifugal separator of this invention is approximately 40% greater with substantially equal pressure drop as compared with conventional cylindrical stack separators.

Material removal plenums of generally spiral configuration are also provided at opposite ends of the separator drum and communicate with corresponding separation plenum chambers. Each of the material removal plenums is provided with a material discharge opening, preferably located at the lower portion of a respective material removal plenum. The centrifugal force exerted on the air streams during flow along respective spiral paths causes particulate material in the air streams to migrate toward the spiral inner surface of the separation plenum chambers. Particulate materials separated from the two air streams directed simultaneously into the separation plenum chambers collects in the outer material removal plenums and eventually is discharged from the outer material removal plenums through the material discharge openings in lower portions of respective material removal plenums.

In another form of the separator, the central spiral plenum chamber has either one or two air inlets while the spiral separation plenum chambers on opposite sides thereof each have an air discharge outlet. In this form of the separator, the divider stacks are oriented such that they extend away from each other and into corresponding separation plenums. An air stream containing particulate material that must be removed from the air before discharge of the air back into the atmosphere is directed into the air inlet of the central plenum chamber, commences flow in a generally spiral direction within the central plenum chamber, passes through the central aperture in respective divider stacks, flows along spiral paths within the separator plenums, and is discharged through the air outlet openings of the two separation plenum chambers. In this embodiment, particulate material displaced from the air streams by centrifugal force is received in the spiral material removal plenums and gravitates therefrom through the discharge openings of the material removal plenums.

The horizontal separator having side-by-side, simultaneously operable separation plenums which communicate with a central plenum provide a separator which is substantially as effective in removing particulate material from an air stream as a conventional upright cyclone, without occupying as much space as that cyclone and at an advantageous capital cost. In addition, the horizontal disposition of the separator permits air having particulate material entrained therein to be introduced into the separator at any one of a number of different circumferential locations, and to allow for discharge of cleaned air at any point around the circumference of the separator drum. This permits the separator to be connected between the outlet of the dryer and the primary fan at an optimal position, with a minimum overall footprint.

A horizontal separator in accordance with this invention, having side-by-side dual stage separator plenums with associated pressure regain stacks is capable of removing as much as 96% or more of particulate material in a stream of products of combustion and air discharged from a horizontal industrial size product dryer. Thus, by positioning the separator between the primary fan and the dryer, and connecting the fan to one or more conventional cyclones, the level of particulates ultimately discharged into the atmosphere may be maintained at a very low level and one that meets regulatory standards therefor.

DESCRIPTION OF THE PREFERRED EMBODIMENT

Figure 1:
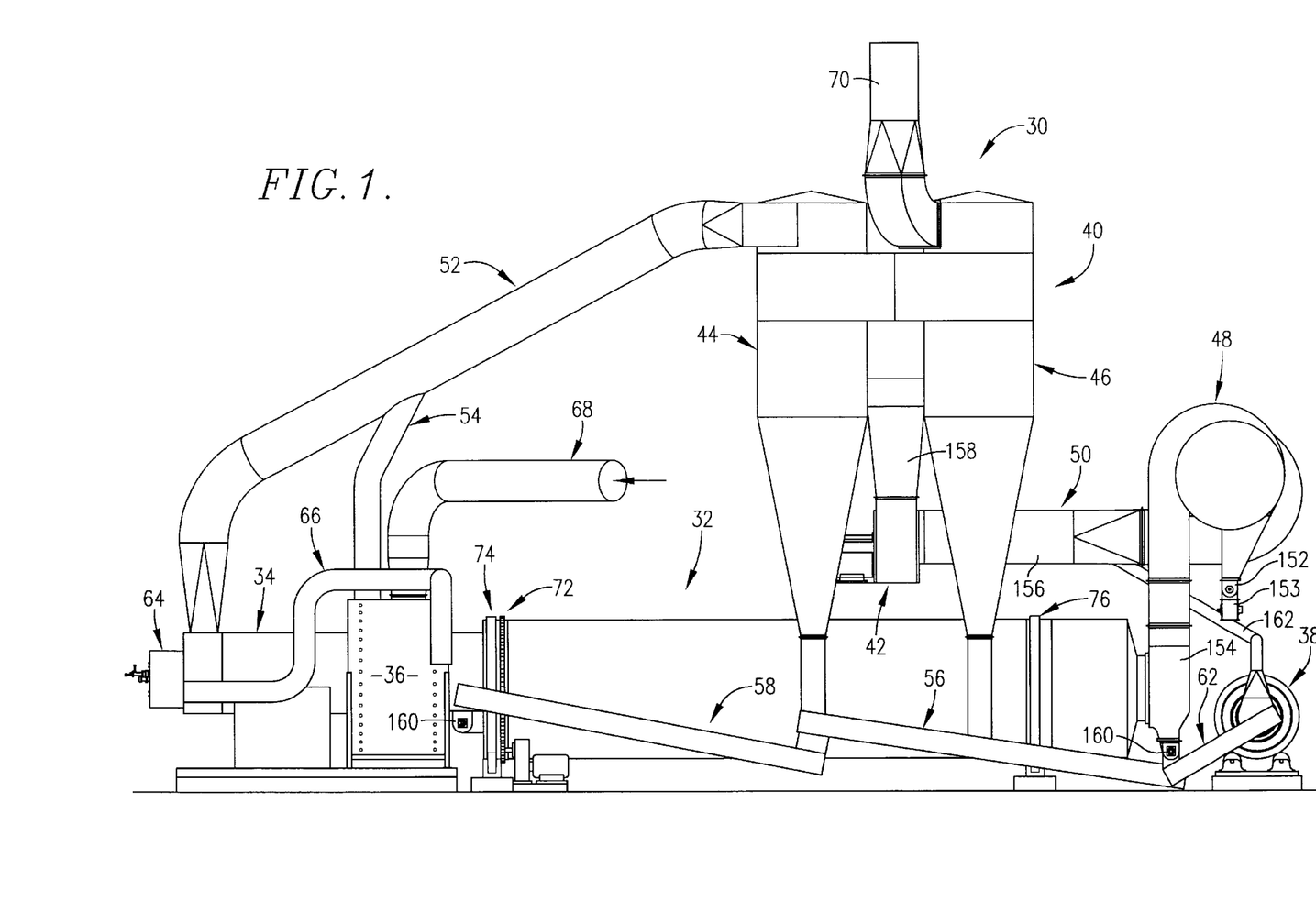
FIG. 1 is an overall elevational view of material drying equipment incorporating horizontal, dual stage separator apparatus in accordance with this invention.

The material drying equipment 30 illustrated in FIG. 1 incorporates improved horizontal, dual stage, negative pressure separator apparatus in accordance with this invention. Equipment 30 includes a rotary drum dryer 32 adapted to receive and dry a particulate material, such as distillers grain by-products, alfalfa, wood by-products, poultry by-products, fish by-products, and other agricultural and industrial particulate materials having a relatively high water content requiring drying to decrease the moisture levels thereof.

A furnace 34 and blending chamber 36 are provided at the inlet end of the rotary drum dryer 32, while a rotary cooling drum 38 is located at the outlet end of the drum for receiving and cooling dried material. The equipment 30 further includes an air-handling unit 40, including a primary fan 42, upright recycle cyclone separator 44, upright discharge cyclone separator 46, horizontal, dual inlet, single outlet, dual stage centrifugal separator apparatus 48 in accordance with one embodiment of this invention, and ducting 50 interconnecting the cyclone separators 44, 46 and fan 42. An optional return air conduit 52 extending from the top of upright recycle cyclone separator 44 to the inlet of furnace 34 has an intermediate blending air conduit 54 leading to chamber 36. A pair of tandem-mounted material recycle screw conveyors 56, 58 which receive particulate material output from the lower ends of cyclone separators 44, 46 extend along the length of drum 32 from the outlet end thereof to a horizontal material input conveyor 60 at the inlet end of the dryer 32. Similarly, a dried material screw conveyor 62 extends from the outlet end of the dryer 32 to rotary cooling drum 38. The furnace 34 is equipped with a gas-fired burner 64 as well as a gas recycle conduit 66 connected between burner 64 and blending chamber 36. Alternatively, a boiler gas recycle duct 68 maybe provided for directing waste heat gases to the blending chamber 36. Air discharge from the equipment 30 is accomplished via discharge duct 70 projecting from the upper end of cyclone separator 46.

During use of the equipment 30, the dryer 32 is rotated (typically at a speed of from about 3–12 rpm) by means of drum drive unit 72 associated with tracks trunnion drum support 74. A track and trunnion drum support 76 rotatably carries the opposite end of the dryer drum 32. Heated air is delivered to the input end of the drum by means of furnace 34, blending chamber 36 and air handling unit 40. A new charge of moist particulate material to be dried is introduced into the return conveyer 56. In addition, a predetermined proportion of partially dried material is returned by conveyors 56, 58 from the outlet end of the dryer back to conveyor 56 for recycling through the dryer. The air-handling unit 40 serves to move air throughout the equipment 30, with exhaust gases being returned to the atmosphere through duct 70. Similarly, particulate material collected in the separators 44, 46 is directed into conveyors 56, 58, respectively, for return to the input conveyor 60.

The drum dryer 32 preferably comprises a dryer of the type that is illustrated and described in my co-pending application Ser. No. 09/858,013, filed May 11, 2001, which is fully incorporated herein by specific reference thereto.

Figures 2, 3:
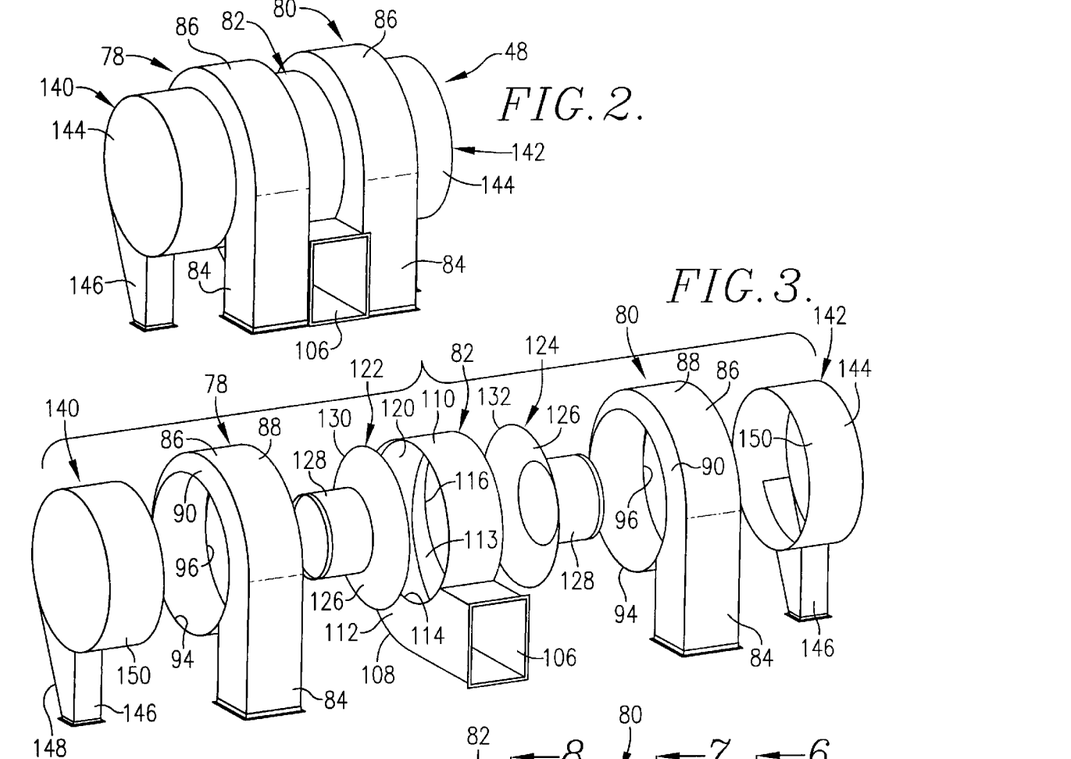
FIG. 2 is a perspective view of an embodiment of a separator apparatus having dual air inlets and a single air outlet.
FIG. 3 is an exploded view of the separator apparatus as shown in FIG. 2.
Figure 4:
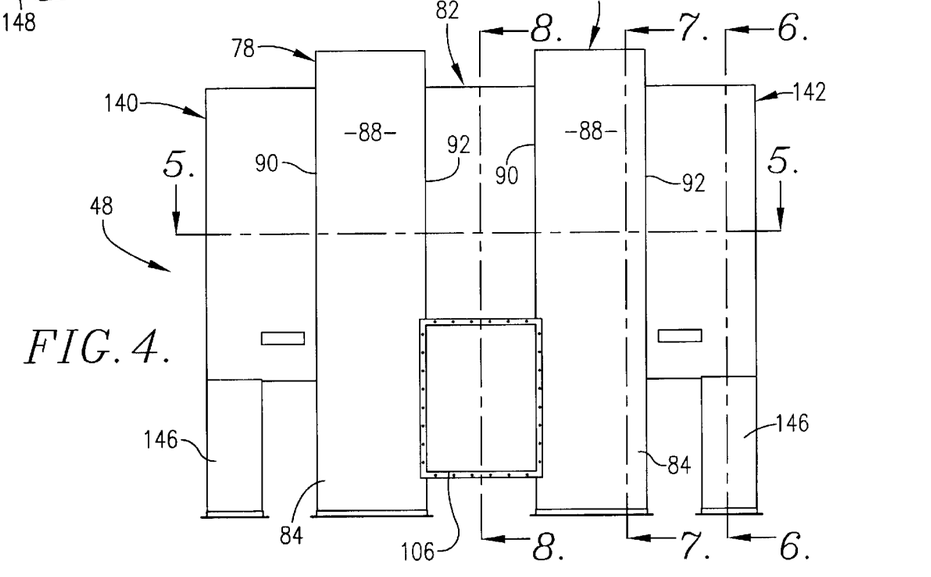
FIG. 4 is a front elevational view of the separator apparatus of FIG. 2.
Figure 5:
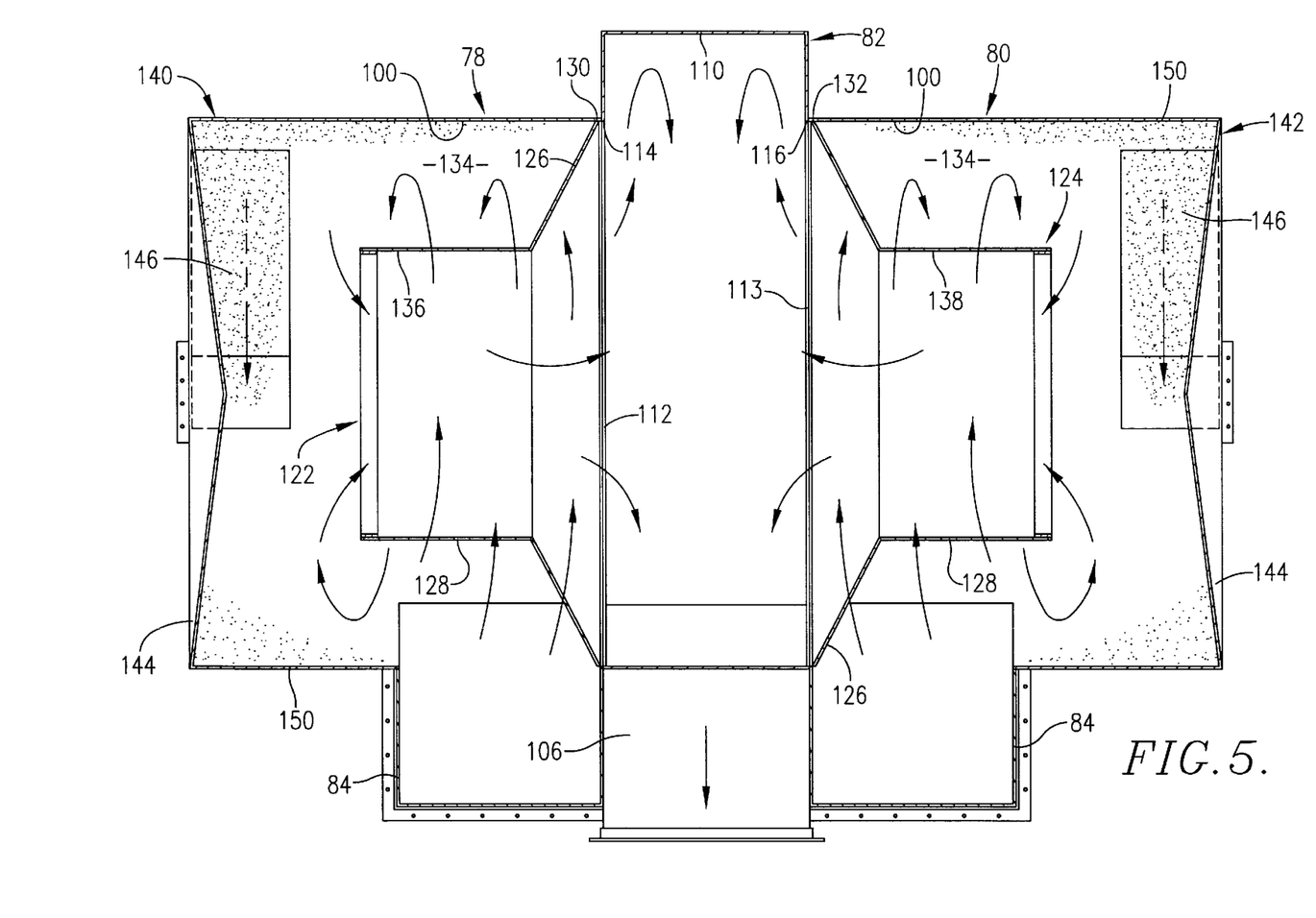
FIG. 5 is a horizontal sectional view taken substantially along the line 5—5 of FIG. 4 and looking downwardly in the direction of the arrows.
Figures 6, 7, 8:
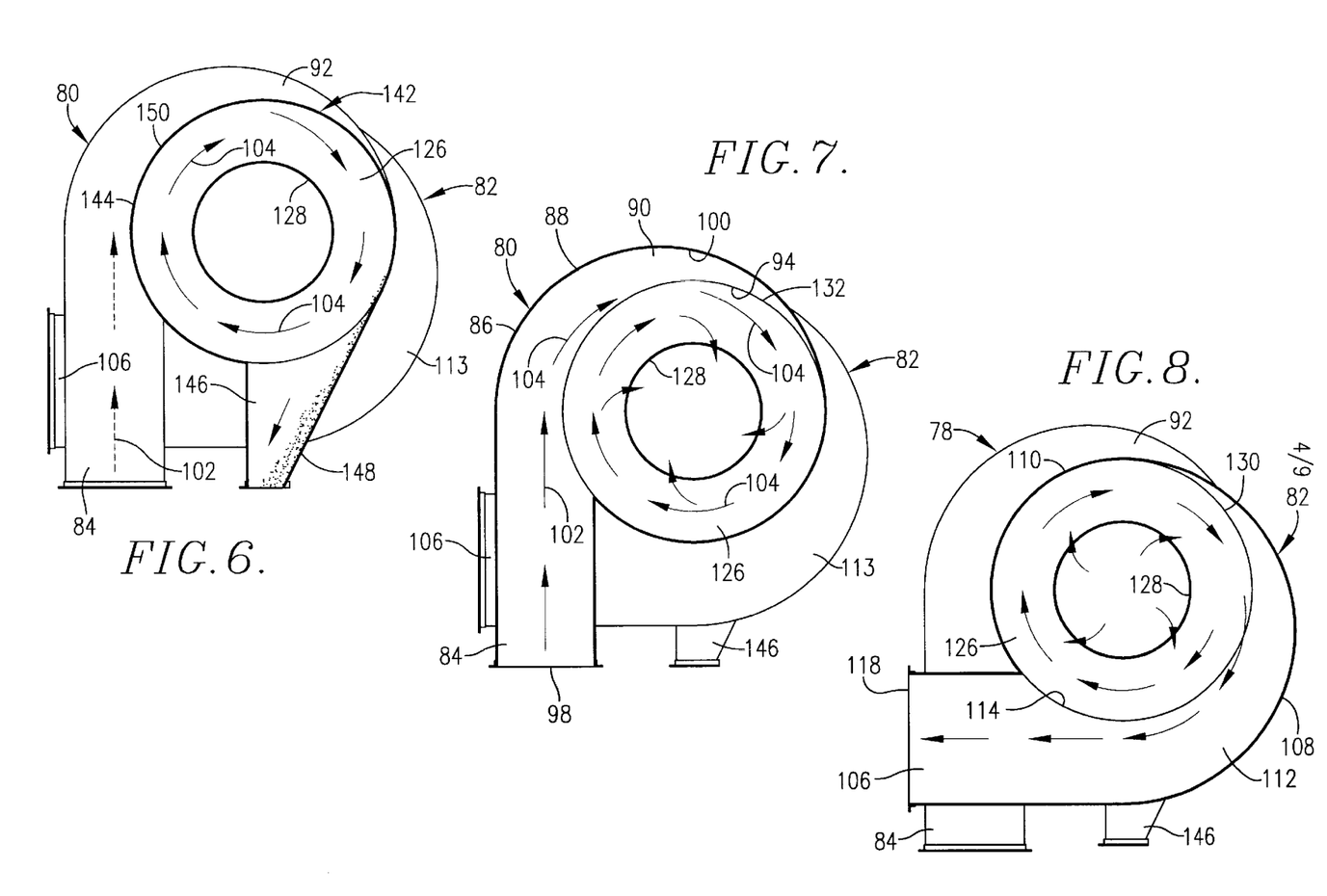
FIGS. 6, 7 and 8 are vertical cross-sectional views taken along the lines 6—6, 7—7 and 8—8, respectively, of FIG. 4 and looking in the direction of the arrows in FIG. 4.

The drum separator apparatus 48 as shown in FIG. 1 is illustrated in detail in FIGS. 2–8 inclusive. Referring to FIG. 2, the separator apparatus 48 includes two primary spiral separation plenum chambers 78, 80 joined to an intermediate spiral discharge plenum chamber 82. As best shown in exploded view of FIG. 3, each of the plenum chambers 78, 80 has wall structure presenting a straight inlet duct portion 84 of square or rectangular cross-section and integral with a curvilinear scroll portion 86 that is tangential to a respective duct portion 84. Each of the scroll portions 86 has a circular wall segment 88 connected to opposed upright wall sections 90, 92 which progressively decrease in width around the perimeter of a respective scroll portion 86. The wall sections 90, 92 thereby each define arcuate openings 94, 96. The inlet duct portions 84 each have a square or rectangular inlet opening 98 (FIG. 7). It is therefore to be seen from the cross-sectional views of FIGS. 6–8 that the curvilinear inner surface 100 of wall segment 88 of each of the plenum chambers 78, 80 causes the initially straight air stream designated by the arrows 102 containing entrained particulate materials which enters inlets 98 of inlet duct portions 84 of plenum chambers 78, 80 to follow a spiral path designated by the arrows 104 within each of the plenum chambers 78, 80.

The air discharge plenum chamber 82 has a straight, air discharge duct portion 106 which is square or rectangular in cross-section. Chamber 82 has a curvilinear scroll portion 108 that is tangential to duct portion 106. Scroll portion 108 has a circular wall segment 110 connected to opposed upright wall sections 112, 113 which progressively decrease in width around the perimeter of the scroll portion 108. Wall sections 112, 113 thus define arcuate openings 114, 116. Discharge duct portion 106 has a square or rectangular discharge opening 118 (FIG. 8). It is to be understood that openings 94, 96 of plenum chamber 78, the openings 114, 116 of plenum chamber 82 and the openings 94, 96 of plenum chamber 80 are all of equal diameter and that chambers 78, 82 and 80 are in side-by-side interconnected relationship as shown in FIGS. 2 and 4. It is noteworthy in this respect though that the wall segment 110 of scroll portion 108 of discharge plenum chamber 82 is of arcuate configuration defining part of a circle that has a diameter less than the diameter of the curvilinear, partial circle defining wall segments 88 of plenum chamber 78, 80.

Vertically oriented, drum chamber divider members 122, 124 are provided within each of the plenum chambers 78, 80 on opposite sides of the discharge plenum chamber 82. Viewing FIGS. 3 and 5, each of the drum divider members 122, 124 comprises a frusto-conical open-ended pressure regain stack facing in opposite directions. Thus, each velocity recovery stack member 122, 124 has flared conical segment 126 integrally joined to a cylindrical segment 128. The pressure regain stack member 122 is housed within plenum chamber 78 while pressure regain stack member 124 is housed within plenum chamber 80. From FIG. 5, it can further be seen that the cylindrical segments 128, 138 of each of the pressure regain stack members 122, 124 is of lesser diameter than the inner surfaces 100 of plenum chamber 78, 80 so that a space 134 is presented between each of the members 122, 124, and surfaces 100. The outermost circular edge 130 of the velocity recovery stack member 122 is joined to scroll portion 86 of plenum chamber 78 within opening 96 thereof and to scroll portion 108 of plenum chamber 82 within opening 114. Similarly, the outermost circular edge 132 of the velocity recovery stack member 124 is joined to scroll portion 86 of plenum chamber 80 within opening 94 thereof and to scroll portion 108 of plenum chamber 82 within opening 116. Divider members 122, 124, which project away from the discharge plenum chamber 82 in opposite direction, define apertures 136, 138 respectively that are of the same diameter and are axially aligned horizontally of the drum structure.

Spiral path defining particulate material air discharge plenum chambers 140, 142 are provided outboard of plenum chambers 78, 80, respectively. Each of the plenum chambers 140, 142 has a closed end cylindrical housing section 144 as well as a particulate material delivery duct 146 depending therefrom for removal of collected product from chambers 140, 142 which communicate directly with respective plenum chambers 78, 80. It can be seen from FIG. 6, for example, that each of the ducts 146 has an inclined wall 148 which is tangential with a respective outer cylindrical wall 150 of each of the plenum chambers 140, 142. In the normal operating orientation of separator apparatus 48, the air inlet ducts 84 are upright at an angle of about 0° (180°) while the discharge ducts are horizontally offset from the inlet duct portions 84 of plenum chamber 78, 80 as shown in FIGS. 5–8. In this manner, the foot print of separator apparatus 48 is minimized in that a particulate bearing air stream may be directed vertically into the plenum chambers 78, 80 while a cross conveyer 152 (FIG. 1) may be positioned in underlying relationship to the material delivery ducts 146 of plenum chambers 140, 142 and air lock 153 (FIG. 1) allows material discharge from negative pressure separator apparatus 48.

Separator apparatus 48 is especially adapted to be utilized in drying equipment as depicted for example in FIG. 1. The inlet ducts 84 of plenum chambers 78, 80 are both connected to a common gravity separator duct 154. The discharge duct 106 of discharge plenum chamber 82 is joined to a duct 156 connected to the negative pressure side of the primary fan 42. The outlet duct 158 from fan 42 leads to the cyclone separators 44, 46. The combination air and dried particulate material output from dryer 32 is directed into gravity separator 154. The heavy particles in the air stream gravitate downwardly in the separator and are collected in the cross conveyor 160 for delivery to the cooling drum 38.

The air stream pulled upwardly in separator 154 by the negative pressure of fan 42 contains particulate material fines. The particulate material bearing air stream entering separator apparatus 48 via twin inlet ducts 84 follows respective serpentine path of travel as indicated by the arrows of FIGS. 5 and 7. The separate air streams also flow around the circumference of cylindrical segment 128 of each of the dividers 122, 124. The spiral path of the particulate bearing air streams flowing around corresponding drum dividers 122, 124 causes the particles to be separated from the air stream by centrifugal action. The separated particles which tend to collect on the inner surface 100 of each of the wall segments 88 of plenum chambers 78 and 80 gravitate toward the discharge ducts 146 of discharge plenum chambers 140, 142 for delivery into the cross conveyor 152 and air lock 153 that connects to duct work 162 also leading to conveyor 62 feeding the cooling drum 38.

The air flowing around the divider members 122, 124 within plenum chambers 78, 80 enters the apertures 136, 138 of members 122, 124 and passes into the discharge plenum chamber 82. The divider members 122, 124 function as pressure regain stacks so that the air passing out of separator apparatus 48 through discharge duct portion 106 of discharge plenum chamber 82 regains a substantial fraction of the pressure loss that would otherwise occur in the air entering twin inlet ducts 84 of plenum chambers 78, 80. Pressure regain is accomplished by acceleration of the air streams to the radius of the outlets of stacks 136, 138.

Figures 9, 10, 11:
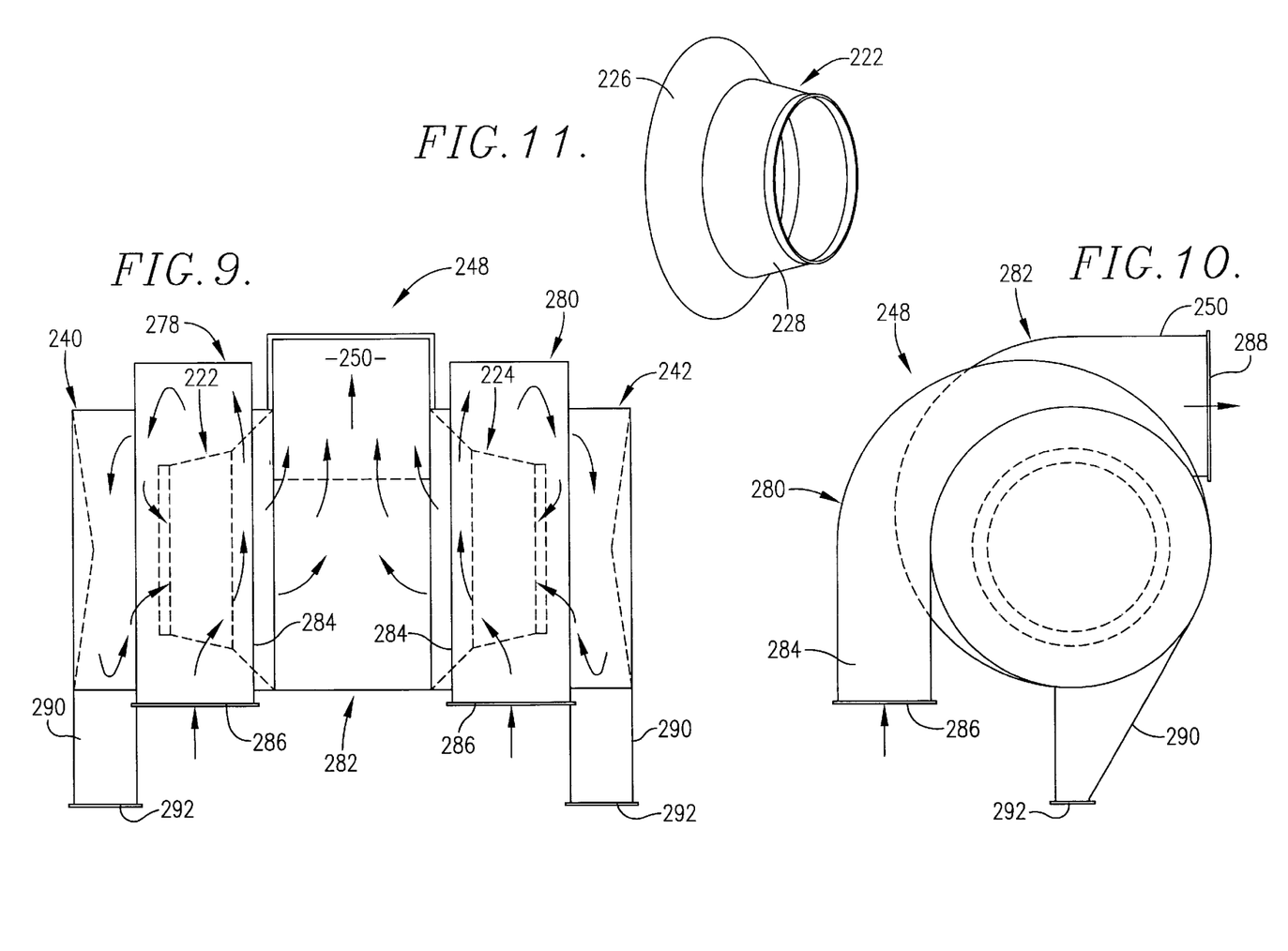
FIG. 9 is a schematic front elevational view of a second embodiment of the separator apparatus of this invention having dual air inlets and a single air outlet.
FIG. 10 is a schematic end elevational view of the separator apparatus as shown in FIG. 9.
FIG. 11 is a perspective view of one of the two spaced, open-ended, frusto-conical pressure regain divider members housed within the separator apparatus as shown schematically in FIG. 9.

A second embodiment of the separator apparatus and which is designated 248 is illustrated in FIGS. 9–11. Separator apparatus 248 also has dual air inlets and a single air outlet but in this instance the outlet is in the upper part of the separator drum, and the pressure regain divider members within the separator are of a different configuration than drum divider members 122, 124 of separator apparatus 38. The spiral defining inlet plenum chambers 278, 280, of separator apparatus 248 are of construction similar to plenum chambers 78, 80 and discharge plenum chambers 240, 242 are similar to discharge plenum chambers 140, 142. The discharge plenum chamber 282 differs from plenum chamber 82 of separator apparatus 248 in the disposition of the air stream discharge duct portion 250. It is to be seen though that the inlet duct portions 284 of plenum chambers 278, 280 defining separate inlets 286 duct portion 250 defining outlet 288 are at 90° angles with respect to duct portion 250 and thereby outlet 288. Thus, separator apparatus 248 is adapted to be connected to gravity separator 154 and a primary fan such as fan 42 in a manner similar to the connection of separator apparatus 48 to these components. Utilization of separator apparatus 248 instead of separator apparatus 48 will thus be dictated by the elevation of the duct 156 of a particular drying equipment installation.

The open ended pressure regain divider stacks or members 222, 224 utilized in separator apparatus 248 differ from divider members 114, 116 in that the members 222, 224 are of overall general conical configuration having a frusto-conical inner segment 226 joined to a smaller diameter frusto-conical segment 228. Viewing FIG. 9, it is to be observed that the pressure regain divider members 222, 224 are positioned within respective plenum chambers 278, 280, are aligned horizontally and located with the smaller ends thereof facing away from one another. Removal of particulate material from the air stream is accomplished in separator apparatus 248 with an even greater fraction of the consequent pressure loss being regained as described with respect to separator apparatus 48, with particulate material being discharged from separator apparatus 248 via discharge duct 290 having an outlet 292.

Figure 12:
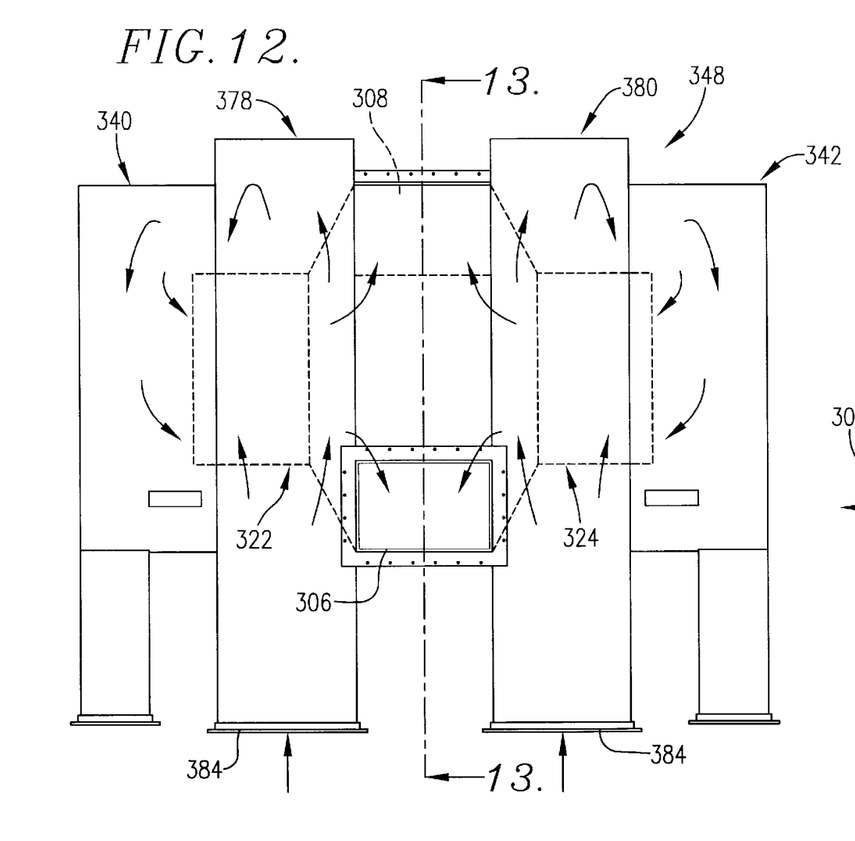
FIG. 12 is a schematic front elevational view of a third embodiment of the separator apparatus of this invention having dual air inlets and dual air outlets of essentially equal area.
Figure 13:
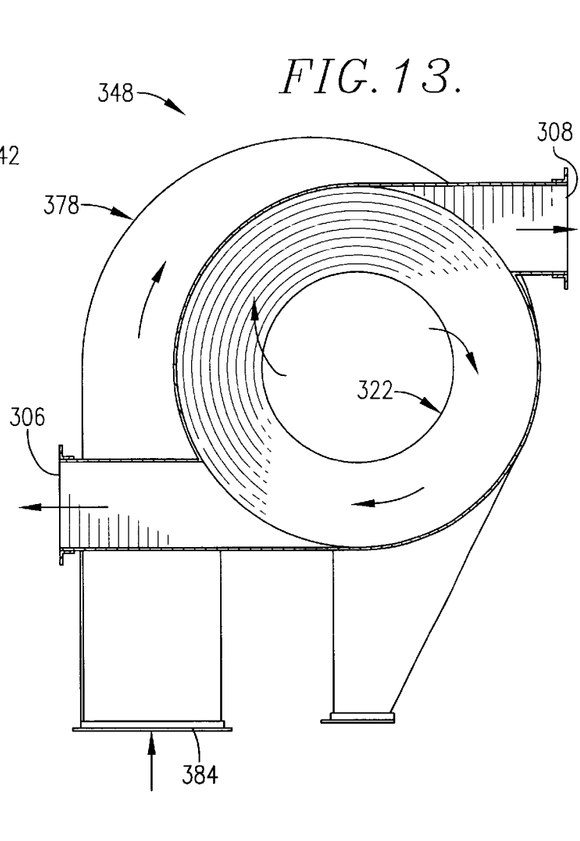
FIG. 13 is a vertical cross-sectional view taken along the line 13—13 of FIG. 12 and looking in the direction of arrows.

The third embodiment of the separator apparatus as shown in FIGS. 12 and 13 and broadly designated 348 is of the same construction as separator apparatus 248 but in this instance has dual air inlets 384, 386 leading to plenum chambers 378, 380 respectively. The dual air stream outlets 306, 308, are each of the same cross sectional area. Open ended velocity recovery divider members 322, 324 within plenum chambers 378, 380 are of the same construction and orientation as divider members 122, 124 of separator apparatus 48. Separator apparatus 348 also has discharge plenum chambers 340, 342 outboard of plenum chambers 378, 380 for removal of particulate material separated from the air streams entering separator apparatus 348 through dual air inlets 384, 386. The dual air outlets 306, 308 of apparatus 348 are oriented at an angle of 90° and 270° with respect to dual air inlets 384, 386.

Figure 14:
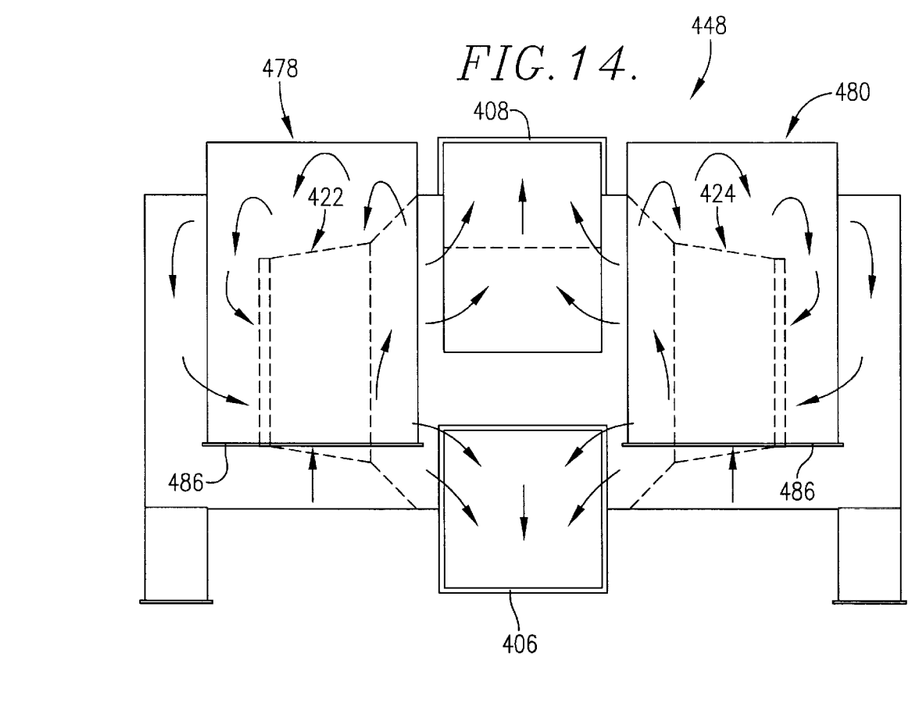
FIG. 14 is a schematic front elevational view of a fourth embodiment of the separator apparatus of the invention having dual air inlets and dual air outlets in which each of the outlets is of a different areas.
Figure 15:
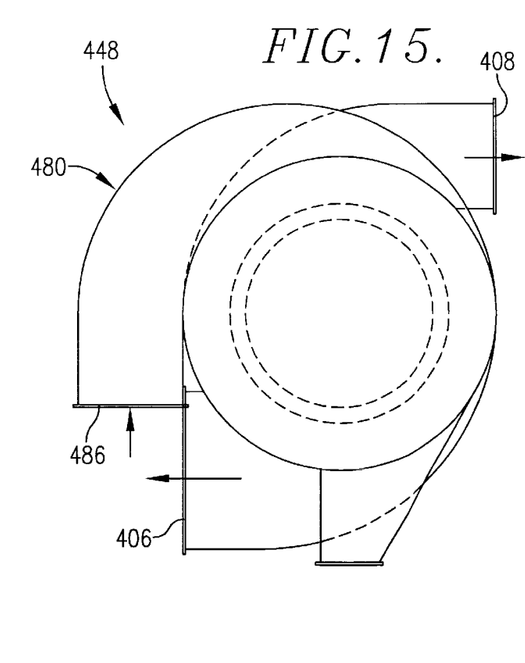
FIG. 15 is a schematic end elevational view of the separator apparatus as shown in FIG. 14.

FIG. 14 illustrates a fourth embodiment of the separator apparatus and which is designated 448 has dual rectangular air inlets 484, 486 of substantially equal cross sectional area, as well as dual air outlets 406, 408. In this embodiment, outlet 406 is of approximately twice the cross sectional area of air outlet 408. The pressure regain divider members 422, 424 within plenum chambers 478, 480 are of the same construction as open ended, generally conical pressure regain divider members 222, 224 of separator apparatus 248. It is to be seen from FIG. 15 that the air outlets 406, 408 discharge horizontally in opposite, generally parallel directions.

Figure 16:
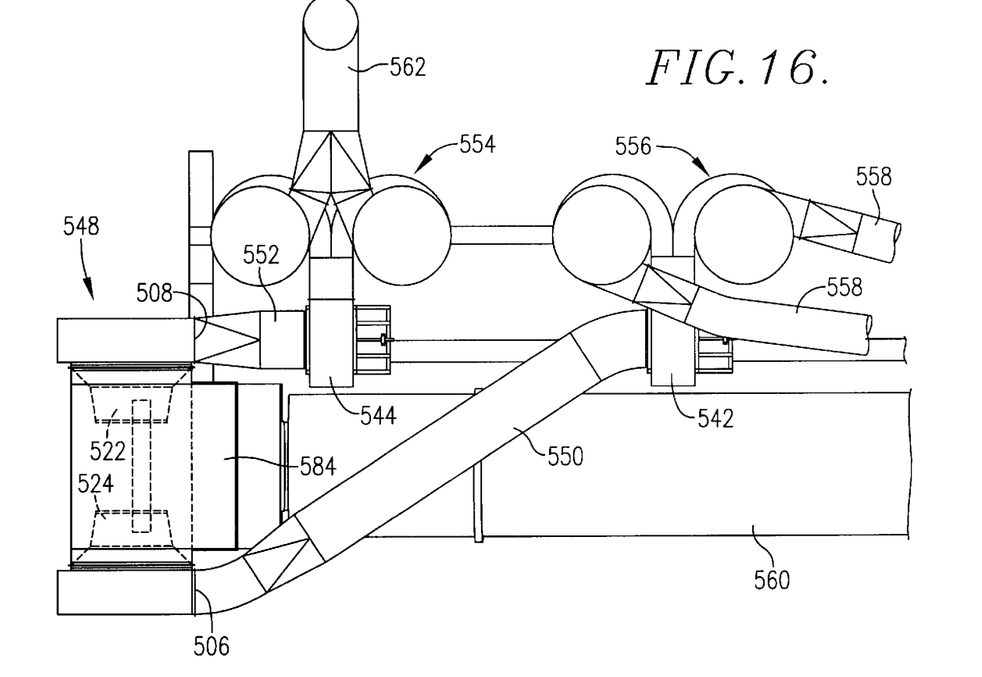
FIG. 16 is a schematic fragmentary plan view of the dryer equipment illustrating separator apparatus having a single central air inlet and dual air outlets outboard thereof, with the separator apparatus being shown in an operative position with the air outlets leading to primary fans connected to respective dual vessel cyclone separators.
Figure 17:
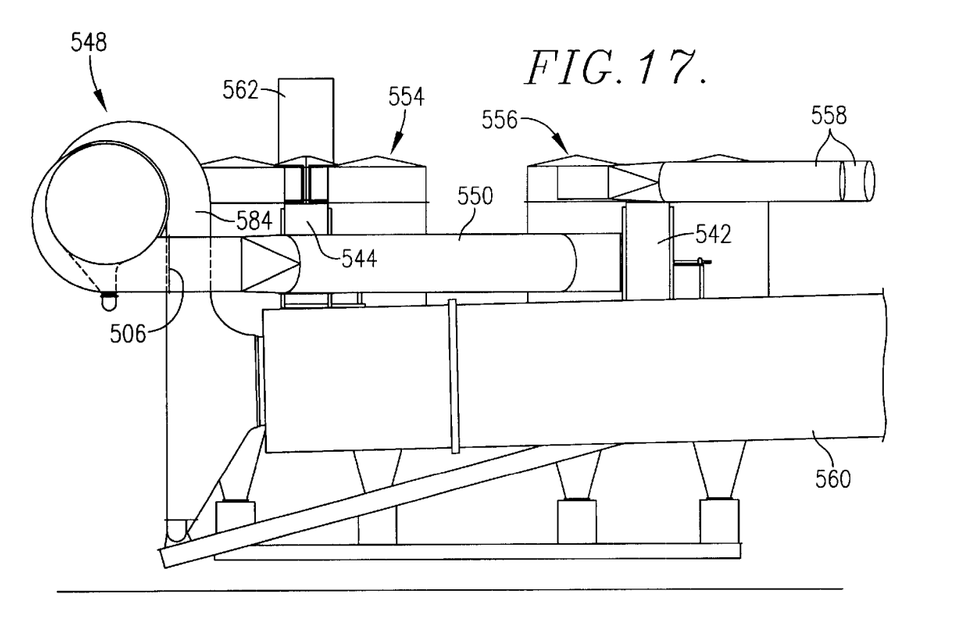
FIG. 17 is a schematic fragmentary side elevational view of the dryer equipment ad depicted in FIG. 16.

A fifth embodiment of the separator apparatus and which is designated 548 in FIGS. 16 and 17 has a single central air inlet 584 and dual outboard discharge air outlets 506, 508. Outlet 506 is connected to the negative pressure side of a first primary fan 542 by duct work 550 while discharge opening 508 is connected to the negative pressure side of a second primary fan 544 by duct work 552. The pressure regain divider members 522, 524 are of the same construction as divider members 222, 224. Thus, separator apparatus 548 is especially adapted for use in drying equipment having dual cyclone separator units 554, 556. Duct 558 returns stack gas from cyclone separator unit 556 to the rotary drum dryer 560 while stack 562 connected to cyclone separator units 554 discharges to the atmosphere.

Figures 18, 20:
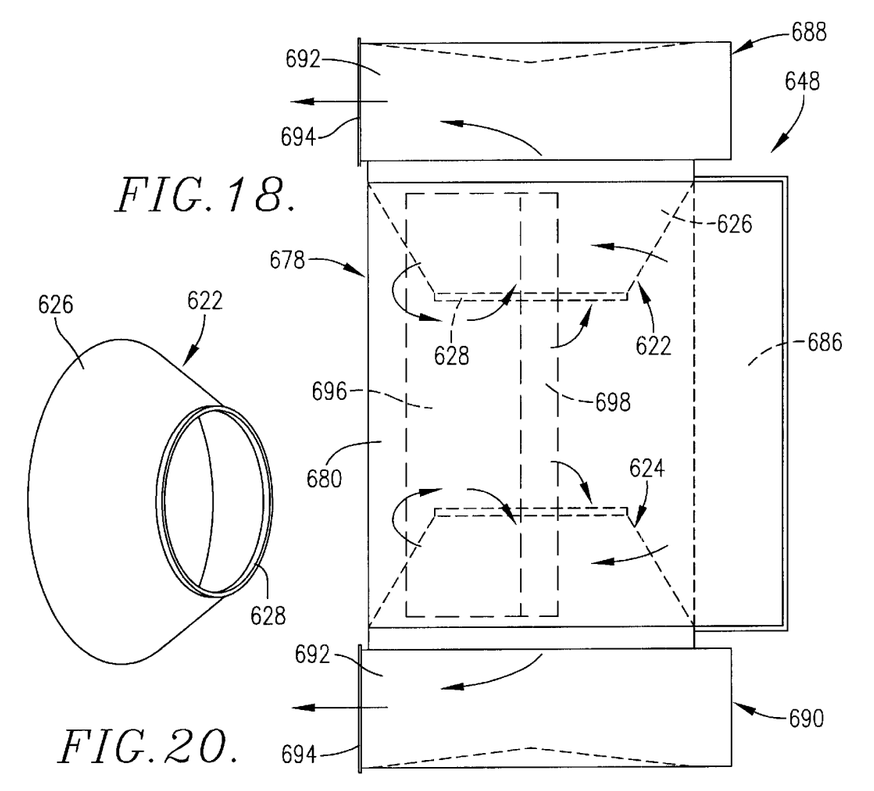
FIG. 18 is a schematic plan view of the separator apparatus as shown in FIG. 17 having a single central air inlet and dual air outlets with single sloped conical pressure regain divider member.
FIG. 20 is a perspective view of one of the two spaced, open-ended, frusto-conical pressure regain divider members housed within the separator apparatus as shown schematically in FIG. 18.
Figure 19:
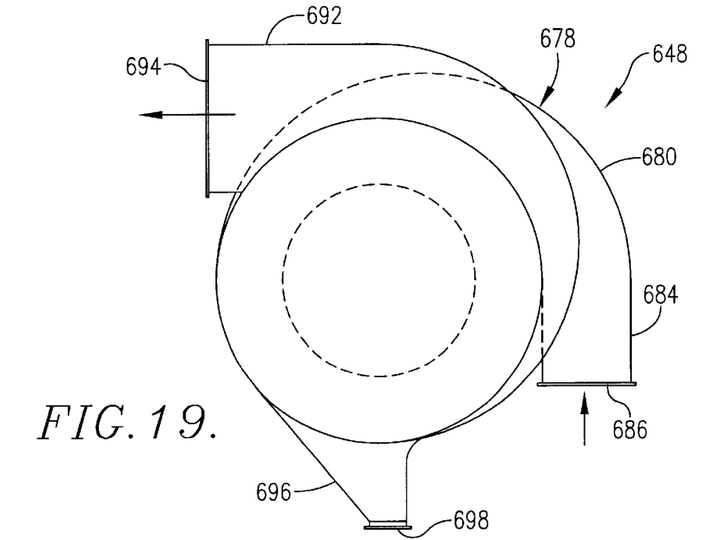
FIG. 19 is a schematic end elevational view of the separator apparatus as shown in FIG. 18.

The sixth embodiment of the separator apparatus and which is designated 648 in FIGS. 19 and 20 has a single central air inlet and dual air outlets. The single central plenum separation chamber 678 extending across a majority of the width of the separator apparatus 678 has wall structure 680 presenting a substantial spiral defining wall surface as illustrated in FIG. 19 connected to inlet duct 684 presenting an inlet opening 686 which extends the full horizontal width of chamber 678. Discharge plenum chambers 688, 690 are provided on opposite sides of central plenum chamber 678 and are in direct communication with the latter. Each of the discharge plenum chambers 688, 690 has a discharge duct portion 692 presenting an outlet opening 694. Particulate material collected in separator apparatus 648 is discharged from plenum chamber 678 through discharge duct 696 extending substantially the full width of plenum chamber 678 and presenting a downwardly directed discharge opening 698. It can be seen from FIG. 19, that air inlet opening 686 and air outlet opening 694 are located at substantially 90° angles with respect to one another. The facing, inwardly directed, directly opposed, open ended, frusto-conical, pressure regain divider stack members 622, 624 located within plenum chamber 678 are in horizontal axial alignment. The divider member 622 of FIG. 20, which is illustrative of both of the divider members 622, 624, has a main open ended conical body 626 and an annular reinforcement flange 628 on the smallest diameter opening of the cone 626.

The horizontally oriented, dual separation chamber apparatus of this invention is advantageous not only from the standpoint of a minimum foot print, but also provides an efficient transition with an economy of duct work from the discharge of the horizontal drum dryer to the primary fan or fans leading to cyclone separator units. In addition, the dual separation chamber apparatus readily accommodates a gravity separator directly connected to the output of the drum dryer and which feeds material into a conveyor coupled to a typical rotary cooler. The separators of FIGS. 9, 14 and 18 will allow approximately 20% to 25% greater flow than the separators of FIGS. 5 and 12.

When the dual separation chamber apparatus of this invention is properly sized in relationship to the design cubic feet per minute air flow through the horizontal drum dryer of drying equipment as shown in the drawings, and is located between a gravity separator such as separator 154 and the negative pressure side of a primary fan, at least about 96% of the fines in the air outflow from the gravity separator 154 may be removed from the air stream. In view of the fact that cyclone separator units such as units 44, 46 can be at least 97% efficient, the level of particulates discharged into the atmosphere from the drying equipment may be maintained very low. The apertures in the pressure regain stack divider units are sized to minimize the air pressure drop through the dual chamber separator apparatus of this invention. Decreasing the diameter of the divider units increases the separating efficiency of the apparatus, which must be then balanced against the pressure drop. Use of conical divider members which function as pressure regain stacks permits recovery of a significant part of the air pressure that would otherwise be lost.

Horizontal dual separation chamber apparatus 48 (248, 348, 448, 548, 648) that typically may be for example 11' in diameter and only 19' long can handle the same air flow as two conventional vertical cyclone separators each of which is 11' in diameter and 45' high.

In a typical drying equipment installation of the type illustrated in FIG. 1, assuming 50 tons per hour of dried particulate material is introduced into the gravity separator 154 from drum dryer 32, 96% or 48 tons per hour of particulate material typically gravitates to the lower end of separator 154 for collection in horizontal cross conveyor 160 and delivery into the rotary cooler 38. Two tons per hour of particulate fines are therefor contained in the air stream(s) entering the separator apparatus 48 (248, 348, 448, 548, 648). Ninety-six percent (96%) of the fines are removed from the air stream in the horizontal dual chamber separator apparatus, resulting in only 0.8 tons per hour of particulates being directed to the inlet of the primary fan(s). When 97% efficient vertical cyclone separator units are used, only 4.8 pounds per hour of particulates are introduced into the atmosphere though the exhaust stack 70. If 99% efficient vertical cyclone separators that are presently commercially available are employed, then the discharge emissions to the atmosphere are no more than about 1.6 pounds per hour.

What is claimed is:

1. Centrifugal separator apparatus for removing particulate material entrained in an air stream, said separator comprising:

a separator drum having wall structure defining a generally horizontally disposed chamber;

said drum having first, second and third air flow openings communicating with the chamber, at least one of said air flow openings being functional as an inlet for a particulate material bearing air stream and at least one of the other of the openings being functional as an outlet for air from which, a significant proportion of the particulate material entering the drum through an air inlet has been removed; and a pair of drum chamber divider members, each of said divider members having an aperture therein, one of said divider members being positioned in the chamber in spanning relationship to the drum wall structure and intercommunicating a first and a second air flow opening and the other divider member being positioned in the chamber in spanning relationship to the drum wall structure and intercommunicating a second and a third air flow opening, said divider members further being positioned in the drum chamber in spaced relationship one from the other with the apertures therein in intercommunication, whereby particulate material entrained in an air stream directed into the chamber through an air inlet is displaced from the air stream as the latter flows through the chamber to an air outlet opening via the apertures in respective divider members, said drum being provided with a particulate material delivery opening positioned to allow particulate material displaced from the air stream to be discharged from the drum chamber, said wall structure of the separator drum having a curvilinear inner surface presenting a spiral air flow path from an air inlet opening to an air outlet opening via the aperture in a corresponding divider member therebetween.

2. Centrifugal separator apparatus as set forth in claim 1 wherein each of said divider members is of generally conical configuration with the apertures therein located generally centrally of a respective divider member.

3. Centrifugal separator apparatus as set forth in claim 2 wherein each of said divider members is configured to present a pressure regain stack.

4. Centrifugal separator apparatus as set forth in claim 2 wherein said conical divider members are positioned with the apertures thereof in axial aligned relationship.

5. Centrifugal separator apparatus as set forth in claim 1 wherein said wall structure of the separator drum has a curvilinear inner face extending to and communicating with the material delivery opening to present a spiral delivery flow path for particulate material removed from the air stream.

6. Centrifugal separator apparatus as set forth in claim 1 wherein said wall structure of the separator drum defines a pair of air inlet openings and an air outlet opening, said wall structure having inner surfaces defining separate air flow paths from the air inlet openings to the air outlet opening via the apertures in corresponding divider members between respective air inlets and said air outlet.

7. Centrifugal separator apparatus as set forth in claim 6 wherein said inlets are located at an angle of about 90° with respect to the air outlet.

8. Centrifugal separator apparatus as set forth in claim 7 wherein said air inlets are oriented generally vertically and the air outlet is oriented substantially horizontally.

9. Centrifugal separator apparatus as set forth in claim 7 wherein said air outlet is located generally below said divider members.

10. Centrifugal separator apparatus as set forth in claim 7 wherein said material delivery opening opens downwardly and is oriented generally vertically.

11. Centrifugal separator apparatus as set forth in claim 1 wherein said wall structure of the separator drum defines a pair of outlet openings and an inlet opening, said wall structure having inner surfaces defining separate air flow paths from the air inlet opening to the air outlet openings via the apertures in corresponding divider members between respective air inlets and said air outlet.

12. Centrifugal separator apparatus as set forth in claim 11 wherein said first and third openings are air outlets and said opening is an air inlet between the air outlets, said wall structure having curvilinear inner surfaces defining separate, spaced spiral air flow paths from the air inlet opening to respective air outlet openings via the apertures in corresponding divider members between the air inlet and said outlets.

13. Centrifugal separator apparatus as set forth in claim 1 wherein said first and third openings are air inlets and said second opening is an air outlet between the air inlets, said wall structure having curvilinear inner surfaces defining separate, spaced spiral air flow paths from a respective air inlet opening to the air outlet opening via the apertures in corresponding divider members between the air inlets and said outlet.

14. Centrifugal separator apparatus as set forth in claim 1 wherein said divider members each comprises a generally open ended, conical-shaped annular element joined to and coaxial with a generally cylindrical component.

15. Centrifugal separator apparatus as set forth in claim 14 wherein said annular elements and the cylindrical components of the divider members extend away from one another in opposite directions.

16. Centrifugal separator apparatus as set forth in claim 1 wherein said wall structure of the separator drum defines a pair of air inlet openings and an air outlet opening therebetween and said wall structure further having curvilinear inner surfaces defining separate, spaced spiral air flow paths from a respective air inlet opening to the air outlet opening via the aperture in a corresponding divider member therebetween, each of said curvilinear inner surfaces decreasing in diameter from the air inlet openings toward the air outlet opening.

17. Centrifugal separator apparatus as set forth in claim 16 wherein the curvilinear inner surface of the wall structure that leads directly to the air outlet opening between respective divider members is configured to present an air path from the air outlet opening to the opposed aperture s in the spaced divider member s of lesser average length than the average length of the arcuate air paths defined by the curvilinear inner surfaces of the wall structure leading away from a respective air inlet opening to an aperture in a corresponding adjacent divider member.

18. Centrifugal separator apparatus as set forth in claim 1 wherein said wall structure of the separator drum defines a pair of air outlet openings and an air inlet opening therebetween and said wall structure further having curvilinear inner surfaces defining separate, spaced spiral air flow paths from the air inlet opening to respective air outlet openings via the aperture in a corresponding divider member therebetween, each of said curvilinear inner surfaces decreasing in diameter from the air inlet opening toward respective air outlet openings.

19. Centrifugal separator apparatus as set forth in claim 16 wherein the curvilinear inner surface of the wall structure that leads to the air outlet opening from opposed apertures in the spaced divider members is of lesser average arcuate length than the average arcuate length of the air paths defined by the curvilinear inner surfaces of the wall structure leading away from a respective air inlet opening to a corresponding aperture of an adjacent divider member.

20. Centrifugal separator apparatus as set forth in claim 1 wherein said wall structure defines first, second and third generally spiral side-by-side, intercommunicating plenum chambers, the first plenum chamber having an air inlet opening, the second plenum chamber having an air outlet opening, and the third plenum chamber having an air inlet opening, said apertured divider members being interposed between the first and second plenum chambers and the second and third plenum chambers, respectively, with the apertures of the divider members in horizontal, generally axial alignment.

21. Centrifugal separator apparatus as set forth in claim 20 wherein said second plenum chamber is provided with a pair of outlet openings that open outwardly from the second plenum chamber in generally opposite directions.

22. Centrifugal separator apparatus as set forth in claim 21 wherein said wall structure defines fourth and fifth plenum chambers each defining a generally spiral air flow path, plenum chambers, the fourth plenum chamber being outboard of said first plenum chamber, in intercommunication with the first plenum chamber, and having a particulate material outlet opening, and the fifth plenum chamber being outboard of said third plenum chamber, in intercommunication with the third plenum chamber, and provided with a particulate material outlet opening.

23. Centrifugal separator apparatus as set forth in claim 22 wherein the second, fourth and fifth plenum chambers are of lesser overall diameter than the first and third plenum chambers.

24. Centrifugal separator apparatus as set forth in claim 20 wherein said air inlets are disposed generally vertically and said air outlet is disposed generally horizontally.

25. Centrifugal separator apparatus as set forth in claim 24 wherein said air inlets are disposed generally vertically and said air outlets are disposed generally horizontally.

26. Centrifugal separator apparatus as set forth in claim 1 wherein said wall structure defines first, second and third generally spiral side-by-side, intercommunicating plenum chambers, the first plenum chamber having an air outlet opening, the second plenum chamber having an air inlet opening, and the third plenum chamber having an air outlet opening, said apertured divider members being interposed between the first and second plenum chambers and the second and third plenum chambers, respectively, with the apertures of the divider members in horizontal, generally axial alignment.

27. Centrifugal separator apparatus as set forth in claim 26 wherein said wall structure defines fourth and fifth generally spiral plenum chambers, the fourth plenum chamber being outboard of said first plenum chamber, intercommunicating with the first plenum chamber, and having a material outlet opening, and the fifth plenum chamber being outboard of said third plenum chamber, intercommunicating with the third plenum chamber, and provided with a material outlet opening.

28. Centrifugal separator apparatus as set forth in claim 27 wherein the second, fourth and fifth plenum chambers are of lesser overall diameter than the first and third plenum chambers.

29. Centrifugal separator apparatus as set forth in claim 20 wherein said air inlet is disposed generally vertically and said air outlet is disposed generally horizontally.

30. Centrifugal separator apparatus as set forth in claim 20 wherein one of said divider member is positioned in said first plenum chamber and the other divider member is positioned in said third plenum chamber.

31. Centrifugal separator apparatus as set forth in claim 22 wherein said one divider member extends into said fourth plenum chamber and said other divider member extends into said fifth plenum chamber.

32. Centrifugal separator apparatus as set forth in claim 26 wherein said divider members are positioned in said second plenum chamber.

33. Centrifugal separator apparatus as set forth in claim 32 wherein said second plenum chamber is provided with a downwardly directed material outlet opening.

34. Centrifugal separator apparatus as set forth in claim 21 wherein one of the air outlet openings is of greater area than the other outlet opening.

* * * * *